United States Patent [19]

Ruyak

[11] 4,327,892
[45] May 4, 1982

[54] NORMALLY MAGNETICALLY ACTUATED VALVE WITH NOVEL NONMAGNETIC OVERRIDE

[75] Inventor: Robert F. Ruyak, Erie, Pa.
[73] Assignee: Autoclave Engineers, Inc., Erie, Pa.
[21] Appl. No.: 185,005
[22] Filed: Sep. 8, 1980
[51] Int. Cl.³ .............................................. F16K 31/08
[52] U.S. Cl. .................................... 251/65; 251/130; 251/288
[58] Field of Search ................ 251/65, 130, 285, 288; 335/306

[56] References Cited

U.S. PATENT DOCUMENTS

| | | | |
|---|---|---|---|
| 3,081,792 | 3/1963 | Hansen | 251/288 X |
| 3,279,744 | 10/1966 | Fieldsen et al. | 251/130 |
| 3,970,285 | 7/1976 | Lonn | 251/288 X |
| 4,106,825 | 8/1978 | Ruyak | 308/139 |

Primary Examiner—Arnold Rosenthal
Attorney, Agent, or Firm—Webb, Burden, Robinson & Webb

[57] ABSTRACT

A packless magnetically actuated valve. A driven magnet assembly is rotatably mounted inside a nonmagnetic bonnet. A drive magnet holder surrounds the bonnet and rotates thereon. The driven magnet assembly turns a stopper positioned in the main valve body between inlet and outlet passages. The bonnet is mounted for rotation and means extend between the bonnet and the driven magnet assembly such that sufficient rotation of the bonnet will cause rotation of the stopper.

11 Claims, 4 Drawing Figures

NORMALLY MAGNETICALLY ACTUATED VALVE WITH NOVEL NONMAGNETIC OVERRIDE

BACKGROUND

This invention relates primarily to a ball, a plug or a butterfly valve. (It may even pertain to a rising stem valve.) Ball, plug or butterfly valves have a stopper that interrupts fluid flow when rotated 90°. In conventional valve designs, a shaft is attached to the stopper and the shaft is actuated by an external handle. The shaft is surrounded by a ring or rings of packing that maintain the pressure in the valve.

This invention relates to magnetically actuated packless valves for high pressure applications. Related patents pertaining to magnetically actuated valves, but not especially for high pressure environments say in excess of 1000 to 2000 psi, are described in U.S. Pat. Nos. 3,347,262 and 3,747,892. Aspects of this invention relate to my own U.S. Pat. No. 4,106,825. See also my copending application Ser. No. 39,900, filed May 17, 1979 now U.S. Pat. No. 4,284,262, dated Aug. 18, 1981, entitled "Magnetically Actuated Stopper Valve".

The known advantage of magnetically actuated valves is the elimination of the stuffing box which has always been a drawback. However, in the past, the use of these valves has been confined to relatively low pressures. The principal reason has been that sufficiently strong permanent magnets did not exist that would actuate the magnetic valve through the thick walls required to contain high pressures. Newly available permanent magnets permit the use of thicker walls in the valve housing providing the possibility of magnetically actuated valves for use at high pressures.

It is an object of this invention to provide a magnetically actuated valve which will reliably open and close. It is a further object to provide a magnetically actuated valve with a fail-safe manual override.

SUMMARY OF THE INVENTION

Briefly according to this invention, there is provided a valve which comprises a pressurizable (i.e., safe at pressures in excess of 1000 to 2000 psi) valve body having two fluid passages and a central space therebetween. A stopper is positioned within the central space. The stopper may be positioned to stop flow through the valve. For example, if the stopper has an opening therethrough, it may be brought into registry with aligned fluid passages or turned to block the passages. A nonmagnetic tubular pressurizable bonnet extends away from the central space and the tubular bonnet has an extended axis which passes through the central space and the stopper.

The bonnet is normally clamped to the valve body in pressure sealing relationship such that it will not rotate but such that it may be loosened to that it can rotate and remain in pressure sealing relationship with the valve body. A hole is provided between the central space and the bonnet. A cylindrical driven magnet holder coaxial with and surrounding said tubular bonnet carries circumferentially magnetized magnets, for example, rare earth cobalt magnets. Typically, these magnets comprise an even number of north and south magnetic poles having substantially equal angular spacing. A rotatable control shaft projects through the opening into said central space and engages the stopper such that turning the shaft positions, as by turning, the stopper. The shaft is journaled within the bonnet and has mounted thereto a driven magnet assembly. Typically, the driven magnet assembly comprises circumferentially magnetized cylindrical magnets, for example, rare earth cobalt magnets defining an equal number of north and south magnetic poles having substantially equal angular spacing. When the cylindrical holder is turned, the driven magnet assembly and control shaft will follow.

The bonnet is arranged to be loosened and rotated. A peg or the like is fixed in either the driven magnet assembly or the bonnet and extends into a keyway or groove in the other. The keyway permits the driven magnet assembly to rotate through a given angle, say 90°, before the peg obstructs rotation. When the bonnet is secured, the rotation of the driven magnet assembly is restricted to the given angle. When the bonnet is loosened and sufficiently rotated, the driven magnet assembly will be rotated by torque transferred by the peg. Thus, if for some reason sufficient turning torque cannot be transferred magnetically to the driven magnet assembly, the valve may be actuated by the manual override. It should be noted that no seals, (for example, O-rings), are required for the manual override described herein over and above those that would be required if the override feature were not provided.

Preferably, the peg is set in a bore near the lower end of the driven magnet assembly closest to the valve body and the keyway is located in the bonnet near the lower end thereof. It is preferred that the keyway open to the lower axial end of the bonnet. Thus, the bonnet may be easily slid into place over the driven magnet assembly during manufacture without being obstructed by the peg. Further, it is preferred that the seal, for example O-ring, be placed on the outer surface of the bonnet, or in circumferential grooves provided therefor.

THE DRAWINGS

Further features and other objects and advantages of this invention will become clear from the following detailed description made with reference to the drawings in which FIG. 1 is a section of one embodiment of this invention, FIG. 2 is a top view of the embodiment of FIG. 1 with the driven magnet assembly removed, FIG. 3 is an isometric drawing of a bonnet suitable for valves according to this invention, and FIG. 4 is a section view of yet another embodiment of this invention.

DESCRIPTION OF THE PREFERRED EMBODIMENT

Figure 2:
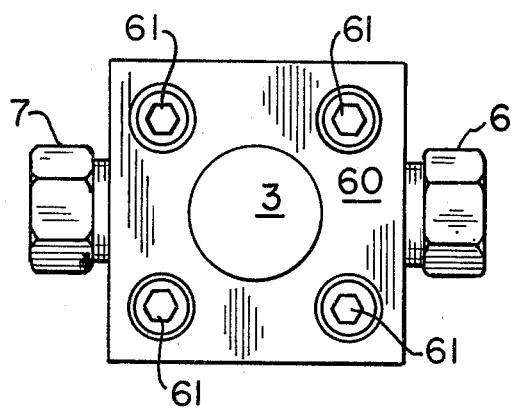
Figure 3:
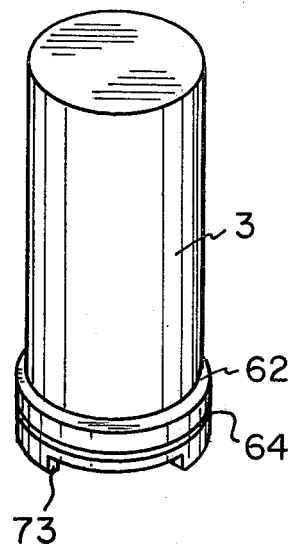
Figure 1:
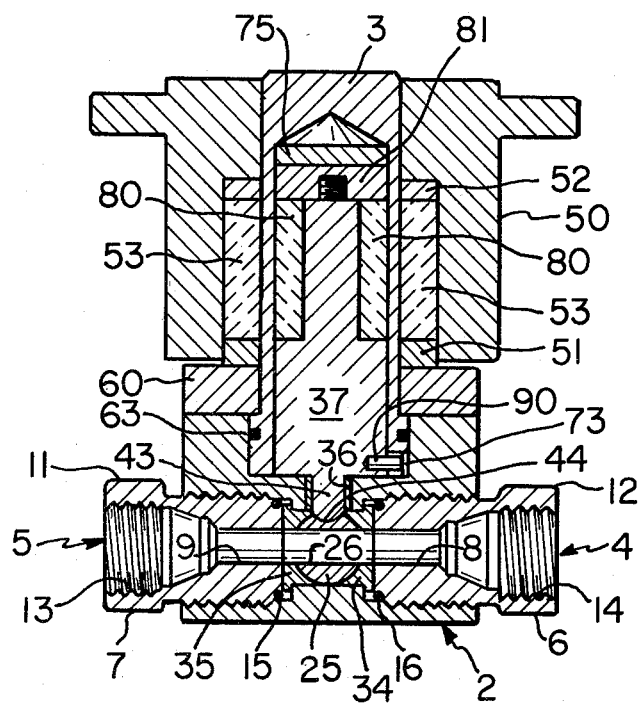

Referring now to FIGS. 1, 2, and 3, a valve body comprises a steel shape, having a fluid passage portion 2 and a nonmagnetic bonnet 3. In a typical embodiment, the fluid passage portion is arranged for aligned inlet 4 and outlet 5 passages. The bonnet 3 has tubular cylindrical walls having a cylindrical axis transverse to the direction of the inlet and outlet passages. The tubular walls of the bonnet are not integral with the remainder of the valve body. The bonnet 3 may have an integral cap closing off the end away from the fluid passage portion or a cap may comprise a plug or plugs threadably engaging the bonnet.

The lower or open end of the bonnet has a cylindrical flange 62. Thus bearing plate 60 having an opening therein just greater than the outer diameter of the bonnet above the flange 62 may be placed over the bonnet and bolted to the valve body 3 by bolts 61 passed through bores in the plate and into threaded bores in the valve body. The bearing plate 60 pressing upon the cylindrical flange 62 of the bonnet will secure the bonnet from rotating. Note that the bolts 61 are countersunk in the plate to be out of the way of the driven magnet assembly. On the outer cylindrical surface of the cylindrical flange on the bonnet is a circumferential groove 64 to hold an O-ring seal 63 or the like. It is not necessary to provide a complicated packing as only in emergency situations will the bonnet be rotated within the O-ring. By loosening the bolts 61, it will be possible to turn the bonnet. The pressure seal provided by O-ring 63 will not be affected.

Opposite tubular valve body extensions 6, 7 which are identical elements, are threaded into the remainder of the valve body. The bores 8, 9 within the extensions define fluid passageways. The extensions have exposed bosses 11, 12 which are provided with means for connecting the valve inlet and outlet to the remainder of the high pressure system. Means for making the connections such as threads 13, 14 are understood in the art.

O-rings 15, 16 are provided on a recessed cylindrical ledge between the valve body extensions 6, 7 and the main valve body 2. These O-rings are compressed when the valve body extensions turn into the valve body and seal one to the other. Between the valve body extensions exist a central space. Within the central space is located the stopper 25 having a passage 26 passing therethrough which can be brought into registry with the inlet and outlet passages 8, 9 permitting flow therebetween. By 90° rotation, the stopper, shown in FIGS. 1 and 2 as a ball, may block flow. Valve seats 34, 35 are shaped to conform to the outer surface of the stopper which must, of course, have rotational symmetry around the axis on which it is rotated. In the valve shown in FIG. 1, the stopper is a ball or sphere. Hence, the end faces of the seats are curved surfaces of an imaginary spherical segment.

An opening 36 passes between the central space and the bonnet. A rotatable control shaft 37 is journaled in the bonnet and passes through the opening 36. On the bottom of the control shaft 37 is a key 43. The ball 25 has a keyway 44 for receiving the key. Thus the shaft cannot be rotated without also rotating the ball 25. The key 43 may slidably engage the keyway 44 and the bottom edge of the key (considering the orientation in FIG. 1) may be spaced from the bottom of the keyway. Thus a certain amount of relative movement of the shaft and ball is permitted. This enables a small amount of self alignment of the ball within the central space.

A cylindrical holder 50 for drive magnets is rotatably mounted to the bonnet by bearings 51, 52 which may simply be nylon rings. The cylindrical holder 50 may suitably be fabricated from aluminum. The function of the cylindrical holder is to carry drive magnets 53 which preferably are cylindrical magnets of the rare earth cobalt types (best of all samarium cobalt). The magnets have a plurality of alternating north and south poles at least around the inner periphery thereof.

The control shaft 37 carries circumferentially magnetized cylindrical rare earth cobalt magnets 80 defining an equal number of north and south magnetic poles having the same equal angular spacing as the magnets in the housing 50. It is preferable that the magnets 80 are encapsulated within a stainless steel sheath. In the embodiment illustrated, a top cap 81 defines an upper axial end of the encapsulating shield for the magnets 80. It is shown to be threaded to the shaft 37. The upper face of the cap 81 bears upon a thrust bearing 75 of synthetic material such as polytetrafluoroethylene. A very thin can is welded to the cap 81 and shaft 37.

Extending radially outward from shaft 37 of the driven magnet assembly is a peg 90. The peg enters the cylindrical groove 73 in the bonnet. (See FIG. 3) Thus the driven magnet assembly can be magnetically turned through 90° without interference. At the end of the 90° rotation in either direction, the pin strikes the end of the groove and inhibits further rotation. (The groove could be greater or lesser than 90° in which event the free rotation will be greater or lesser). In the event of a lock up of the valve that cannot be magnetically actuted, the bonnet can be loosened and turned through a maximum of 180° in either direction to cause the valve stopper to turn through 90°. The bonnet may be turned by placing a wrench on the exposed end of the bonnet when the driving magnet assembly is pulling away.

Figure 4:
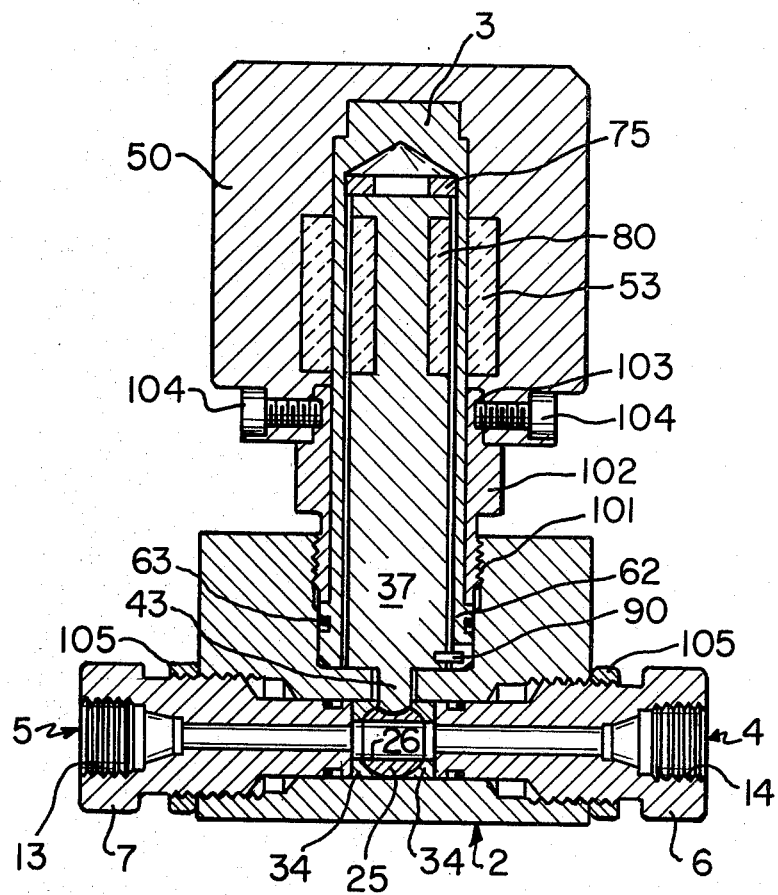

Referring now to FIG. 4, there is shown yet another embodiment of this invention. The numerals less than 100 on FIG. 4 designate items which directly correspond to items described with reference to FIGS. 1, 2, and 3. The fluid passage portion 2 has a threaded well 101 surrounding the opening between the central space and the bonnet 3. The upper portion of the well has internal threads. The lower portion of the well is not threaded but rather has a smooth, cylindrical surface. The smooth cylindrical surface at the bottom of the well is just greater than the outer cylindrical surface of the cylindrical flange 62 on the bonnet 3. A gland 102 being a hollow cylindrical shape having external threads which engage the internal threads of the threaded well has a central cylindrical opening that slides over the bonnet 3. The gland has an inner diameter which is less than the outer diameter of the cylindrical flange 62. Thus, when the gland is threaded into the well the gland engages the cylindrical flange 62 holding the bonnet in place against the valve body. The gland 102 thus holds the bonnet to the fluid passage portion or valve body. When the gland is tightened, the bonnet cannot be rotated. When the gland is loosened, the bonnet can be rotated. Thus the rotation of the bonnet can effect a manual activation or change in position of the stopper element in the valve; that is, by a direct physical interaction.

The gland has a cylindrical groove 103 near the top thereof. Set screws 104 in the drive magnet holder may be turned to just enter the cylindrical groove thus preventing easy removal of the drive magnet housing 50. Note that by placing the cylindrical groove for retaining the drive magnet assembly in the gland, no groove is necessary in the bonnet. Thus it is possible to provide a physical sliding attachment of the drive magnet assembly to the valve body without putting a groove or the like in the bonnet. The bonnet is a pressure containing structure and it is advantageous to maintain the bonnet free from edges and grooves that might be stress riser locations. It is not, of course, absolutely essential to provide the physical sliding engagement between the valve body and the drive magnet assembly as the magnetic attraction will hold the drive magnet assembly in place under normal circumstances. The physical engagement is a matter of precaution.

The valve body extensions 6 and 7 are turned into the fluid passage portion as with the embodiment of FIG. 1 and lock nuts 105 are positioned to secure the extensions in place. Thus the extensions can be turned into place with a torque wrench just sufficiently to provide the required sealing but not necessarily sufficiently for permanently wedging of the extensions in place. The lock nut 105 is then tightened permanently securing the extensions in place.

Having thus described the invention with the detail and particularity required by the Patent Laws, what is desired protected by Letters Patent is set forth in the following claims.

I claim:

1. A valve comprising a pressurizable valve body having two fluid passages and a central space between said passages, a closure element positioned within said central space which may be brought into a position stopping communication between the fluid passages, a nonmagnetic tubular pressurizable bonnet having an extended axis passing through the central space, said bonnet having a closed end away from the central space, means for clamping said bonnet to said valve body in pressure sealing relationship such that said bonnet normally will not rotate and such that said clamping means may be loosened so that the bonnet can rotate and remain in pressure sealing relationship with the valve body, said valve body and bonnet defining a central opening connecting the interior of the bonnet and the central space, a cylindrical drive magnet holder coaxial with and surrounding said tubular bonnet, said holder mounted rotatably thereto, said holder carrying magnets defining an even number of north and south magnetic poles, a rotatable control shaft projecting through said central opening, said shaft operatively connected to said closure element such that turning shaft positions said closure element, said shaft having mounted thereto driven magnet assembly comprising magnets defining an equal number of north and south magnetic poles such that when the cylindrical holder is turned, the driven magnet assembly and control shaft will follow, the control shaft and mounted driven magnetic assembly being rotationally supported in the bonnet substantially coaxial therewith, stop means extending between said bonnet and said driven magnet assembly such that while the magnetic assembly can be freely turned a given angular distance without interference by said extending means further rotation is restricted and such that by loosening the clamping means and turning the bonnet through a maximum of said angular distance will cause the shaft to turn permitting manual opening or closing of the valve.

2. A valve comprising a pressurizable valve body having two fluid passages and a central space between said passages, a rotatable stopper positioned within said central space having an opening therethrough which may be brought into registry or out of registry with the fluid passages, a nonmagnetic tubular pressurizable bonnet having an extended axis passing through the central space and rotatable stopper, said bonnet having a closed end away from the central space, means for clamping said bonnet to said valve body in pressure sealing relationship such that said bonnet normally will not rotate and such that said clamping means may be loosened so that said bonnet can rotate and remain in pressure sealing relationship with the valve body, said valve body and bonnet defining a central opening connecting the interior of the bonnet and the central space, a cylindrical drive magnet holder coaxial with and surrounding said tubular bonnet, said holder mounted rotatably thereto, said holder carrying rare earth cobalt magnets defining an even number of north and south magnetic poles, a rotatable control shaft projecting through said central opening, said shaft engaging said stopper such that turning the shaft turns the stopper, said shaft having mounted thereto driven magnet assembly comprising rare earth cobalt magnets defining an equal number of north and south magnetic poles such that when the cylindrical holder is turned, the driven magnet assembly and control shaft will follow, the control shaft and mounted driven magnetic assembly being rotationally supported in the bonnet substantially coaxial therwith, stop means extending between said bonnet and said driven magnetic assembly such that while the magnetic assembly can be freely turned through about 90° without interference by said extending means further rotation is restricted and such by loosening and turning the bonnet through a maximum of 180° will cause the shaft to turn through 90° permitting manual opening or closing of the valve.

3. A valve according to claims 1 or 2 wherein the bonnet has a cylindrical flange on the outer cylindrical surface near the open end thereof and further comprising a pressure plate having an opening therein greater than the diameter of the bonnet but smaller than the diameter of the cylindrical flange for securing the bonnet to the valve body.

4. A valve according to claims 1 or 2 wherein said stop means comprises a peg secured in a bore in the driven magnet assembly, said peg extending radially outward into a circumferential keyway located in the bonnet near the lower end thereof.

5. A valve according to claim 4 wherein said keyway opens to the open axial end of the bonnet.

6. A valve according to claim 5 in which the keyway permits the magnetic drive assembly to turn freely through about 90° degrees.

7. A valve according to claims 1 or 2 wherein said bonnet has a cylindrical flange on the outer cylindrical surface near the open end thereof, said valve body has a well with internal threads about the said cylindrical opening connecting the interior of the bonnet and said central space, said clamping means comprising a gland with external threads for turning into the internal threads of the well, said gland having a surface bearing upon the cylindrical flange.

8. A valve according to claim 7 wherein said stop means comprises a peg secured in a bore in the driven magnet assembly, said peg extending radially outward into a circumferential keyway located in the bonnet near the lower end thereof.

9. A valve according to claim 8 wherein said keyway opens to the open axial end of the bonnet.

10. A valve according to claim 9 in which the keyway permits the magnetic drive assembly to turn freely through about 90 degrees.

11. The valve according to claim 7 wherein the gland extends from the valve body along the surface of the bonnet and the gland has a cylindrical groove in its outer surface at the end spaced from the valve body, and means extending from the drive magnet housing into the cylindrical groove in the gland enabling a sliding physical connection between the gland and the drive magnet housing.

* * * * *

UNITED STATES PATENT AND TRADEMARK OFFICE
CERTIFICATE OF CORRECTION

PATENT NO. : 4,327,892

DATED : May 4, 1982

INVENTOR(S) : Robert F. Ruyak

It is certified that error appears in the above-identified patent and that said Letters Patent are hereby corrected as shown below:

Column 1 Line 57 "to" should read --so--.

Column 4 Line 15 "actuted," should read --actuated--.

Signed and Sealed this

Thirteenth Day of July 1982

[SEAL]

Attest:

Attesting Officer

GERALD J. MOSSINGHOFF

Commissioner of Patents and Trademarks